United States Patent [19]

Hartman et al.

[11] Patent Number: 5,231,147

[45] Date of Patent: Jul. 27, 1993

[54] THERMOSETTING POLYURETHANE STRUCTURAL ADHESIVE COMPOSITIONS AND PROCESSES FOR PRODUCING THE SAME

[75] Inventors: Terrence L. Hartman, New Brunswick; Charles A. Cody, Robbinsville, both of N.J.

[73] Assignee: Rheox, Inc., Hightstown, N.J.

[21] Appl. No.: 842,756

[22] Filed: Feb. 28, 1992

Related U.S. Application Data

[63] Continuation of Ser. No. 336,001, Apr. 10, 1989, abandoned.

[51] Int. Cl.$^5$ .................... C08G 18/32; C08L 75/06; C08L 77/06
[52] U.S. Cl. .................... 525/424; 525/454; 528/61
[58] Field of Search .................... 525/424, 454; 528/61

[56] References Cited

U.S. PATENT DOCUMENTS

| | | | |
|---|---|---|---|
| 3,375,299 | 3/1968 | Levine et al. | 525/424 |
| 4,336,298 | 6/1982 | Schwarz | 428/285 |
| 4,511,626 | 4/1985 | Schumacher | 428/425.6 |
| 4,608,418 | 8/1986 | Czerwinski et al. | 524/296 |
| 4,647,646 | 3/1987 | Hardy et al. | 528/45 |
| 4,803,257 | 2/1989 | Goel | 528/59 |
| 5,075,407 | 12/1991 | Cody et al. | 525/453 |

FOREIGN PATENT DOCUMENTS 7225136  7/1972  Japan .................... 525/424

Primary Examiner—James J. Seidleck
Assistant Examiner—Thomas Hamilton, III
Attorney, Agent, or Firm—Michael J. Cronin

[57] ABSTRACT

The present invention relates to thermosetting polyurethane structural adhesive composites and compositions and processes for producing the same comprising dispersing an amine-terminated solid polyamide resin into a polyurethane base resin to form a nonactivated adhesive composite, and activating the same by heating to form an adhesive composition. Another aspect of the invention relates to dispersing an amine-terminated solid polyamide resin and a water generating compound into the polyurethane base resin and heat-activating the same to form an adhesive composition. The invention also relates to polyurethane base resins suitable for use in the processes of the invention, which may also be moisture cured to form a reactive adhesive composition.

12 Claims, No Drawings

THERMOSETTING POLYURETHANE STRUCTURAL ADHESIVE COMPOSITIONS AND PROCESSES FOR PRODUCING THE SAME

This application is a continuation of application Ser. No. 07/336,001, filed Apr. 10, 1989 now abandoned.

FIELD OF THE INVENTION

The present invention relates to thermosetting polyurethane structural adhesive compositions. The invention also relates to processes for producing thermosetting polyurethane structural adhesive compositions. In the process of the present invention, an in-situ, heat-activated curing mechanism is employed to produce one-component, heat-activated, thermosetting adhesive compositions.

BACKGROUND OF THE INVENTION

Polyurethane chemistry is currently utilized in producing numerous types of adhesive products. Two-component systems, one-component moisture-cured systems, one-component heat-cured systems and one-component thermoplastic hot melt systems have been used to produce adhesive compositions.

Two-component systems require metering and mixing equipment and heated or non-heated fixturing until substantial curing takes place. The final properties of the adhesive compositions produced by such systems depend on the accuracy of the mix ratio and the efficiency of mixing. U.S. Pat. No. 4,336,298 to Schwarz discloses a two-component polyurethane adhesive system useful for bonding together fiberglass reinforced polyester panels used in the construction of automobiles. The adhesive system comprises a base component containing an aromatic diisocyanate, and a hardener component containing a polyester or polyether triol, paraphenylene diamine or orthophenylene diamine, and preferably, a tin catalyst. The base component and hardener component are mixed together just prior to bonding. The panels to which the adhesive is applied are assembled and held together by clamping until the adhesive sets.

One-component, moisture curable adhesive compositions cure rather slowly due to dependence on relative humidity and on the rate of diffusion of atmospheric moisture into the bondline. Further, fixturing may be required. U.S. Pat. No. 4,511,626 to Schumacher teaches one-component, moisture-curable polyurethane adhesive, sealant and coating compositions useful in bonding articles to substrates. The compositions contain (a) prepolymer(s) derived from 4,4'-diphenylmethane diisocyanate, or isocyanate functional derivative(s) of 4,4'-diphenylmethane diisocyanate, and polyol(s) containing hydroxyl groups, and (b) bis[2-(N,N-dialkylamino)alkyl]ethers. The compositions disclosed by Schumacher require several days for cure-through by atmospheric moisture.

One-component, heat-curable adhesive compositions require sustained heating and possibly fixturing to cure. Heat sensitive substrates cannot be used. U.S. Pat. No. 4,647,646 to Hardy et al. discloses one-component, heat-curable polyurethane adhesive compositions useful for bonding nylon or polyester flock to a primed polychloroprene, SBR or EPDM base layer. The composition is prepared as follows. A urethane prepolymer is prepared by reacting an isocyanate compound and a polyol compound. Two thirds of the isocyanate terminals are then reacted with a ketoxime blocking agent. The remaining one third of the isocyanate terminals are reacted with an amine group of a trifunctional amino compound. Following application, the adhesive is heated and the blocking agent is released and the deblocked isocyanate groups are free to react with available amine groups on neighboring prepolymer molecules resulting in curing and crosslinking. Although Hardy et al. claims lower bake temperatures and shorter cure times than the prior art, sustained heating is required after application of the adhesive composition, and use with heat sensitive substrates may not be possible. However, since flocking adhesives are usually sprayed, brushed or rolled as solutions, very thin layers are employed which require less intense curing conditions.

Existing one-component, thermoplastic hot melt adhesive compositions are non-reactive and therefore have inferior heat resistance after application. U.S. Pat. No. 4,608,418 to Czerwinski et al. discloses processes for forming one-component thermoplastic polyurethane hot melt compositions by blending one or more polyisocyanate compounds with one or more hydroxyl terminated polyols, one or more chain extenders and one or more plasticizers. No chemical curing of the composition occurs after its application. Adhesive properties develop as the material cools and resolidifies.

SUMMARY OF THE INVENTION

The present invention overcomes the problems and disadvantages of the prior art by providing a process for producing a thermosetting polyurethane structural adhesive composition wherein an in-situ, heat-activated curing mechanism is employed.

It is an object of the invention to provide a thermosetting polyurethane structural adhesive composition that cures quickly.

It is a further object of the invention to provide a thermosetting polyurethane structural adhesive composition that exhibits superior green strength.

It is another object of the invention to provide such an adhesive composition that exhibits superior structural adhesive properties.

It is an additional object of the invention to provide such an adhesive composition that exhibits superior heat resistance.

It is also an object of the invention to provide a process for producing a thermosetting polyurethane structural adhesive composition wherein a curing mechanism is employed that produces a one-component, heat-activated, thermosetting adhesive composition that is useful in bonding applications in the automotive, aerospace, electronics, marine and furniture assembly industries.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for producing a thermosetting polyurethane structural adhesive composition comprising dispersing an amine-terminated solid polyamide resin into a polyurethane base resin at a temperature of from about 25° C. to about 200° C. to form a nonactivated adhesive composite. The process further comprises heating the same at a temperature of from about 50° C. to about 250° C. to cure the composite and form said adhesive composition.

The invention also provides a process for producing a thermosetting polyurethane structural adhesive composition comprising dispersing an amine-terminated solid polyamide resin and a water generating curing composition into a polyurethane base resin at a temperature of from about 25° C. to about 200° C. to form a nonactivated adhesive composite, and heating the same to a temperature of from about 50° C. to about 250° C. to cure the composite and form the adhesive composition.

The invention also provides a process for improving the particle surface inhibition and stability of the amine-functional polyamide resin comprising treating the polyamide resin by drying, or by treatment with monoisocyanate compounds or by encapsulating the polyamide resin in an inert material prior to dispersing the same into the polyurethane base resin.

The invention also provides a novel polyurethane base resin, which can be used in the above processes, or which may be moisture cured to form an adhesive composite or composition.

The processes of the invention provide one-component, heat-activated, thermosetting polyurethane structural adhesive compositions useful in structural bonding applications in the automotive, aerospace, electronics, marine and furniture assembly industries. The adhesive compositions are fast-curing, exhibit superior green strength, superior structural adhesive properties and superior heat resistance than prior art adhesive compositions. The compositions adhere to a wide variety of substrates and thus are useful in numerous applications.

DESCRIPTION OF THE PREFERRED EMBODIMENTS

Reference will now be made in detail to the present preferred embodiments of the invention.

Preferably, the amine-terminated solid polyamide resin is dispersed into a polyurethane base resin at a temperature of from about 70° C. to about 100° C. to form a composite. The composite is preferably heated to a temperature of from about 120° C. to about 220° C. to activate the polyamide resin to perform as an in-situ curing agent to cure the composite and form a thermoset polyurethane structural adhesive composition.

The polyurethane base resins useful in the processes of the invention are those resins that have melting points preferably at least about five degrees lower than the melting point of the amine-terminated solid polyamide resin employed or the point of water formation or release from the water generating curing composition employed, more preferably from about ten to about twenty degrees lower, most preferably at least forty degrees lower than the melting point of the polyamide resin or the point of water formation or release from the water generating curing composition. The base resin may be in solid, molten or liquid form. The solid resin may be milled.

Polyurethane base resins suitable for use in the processes of the invention may be prepared by known processes. A polyurethane base resin may be prepared by reacting a stoichiometric excess of a polyisocyanate compound with at least one polyol compound, i.e. forming a prepolymer. A stoichiometric excess of the polyisocyanate compound produces isocyanate terminals on the prepolymer chain that can be reacted further with species containing at least two active hydrogen atoms, such as primary and secondary polyamines, water, polyalcohols, polyacids and polymercaptans, resulting in curing.

Exemplary suitable polyisocyanate compounds useful for preparing a polyurethane base resin for use in the present invention include aromatic, aliphatic, cycloaliphatic, and aralkyl polyisocyanate compounds containing from about 6 to about 100 carbon atoms. The term "aliphatic polyisocyanate" as used herein includes any organic polyisocyanate in which the isocyanate groups are attached to saturated carbon atoms. Preferably, the polyisocyanate compound employed contains two isocyanate groups, however, polyisocyanate compounds containing greater than two isocyanate groups are suitable for use in preparing the polyurethane resin of the invention providing that the resulting urethane compound is a liquid or thermoplastic solid. A mixture or a blend of more than one polyisocyanate compound may also be employed. The following polyisocyanate compounds are exemplary suitable compounds for use in the invention: 4,4'-diphenylmethane diisocyanate; 2,4'-diphenylmethane diisocyanate; toluene-2,4-diisocyanate; toluene-2,6-diisocyanate; 3-phenyl-2-ethylenediisocyanate; 1,5-naphthalene diisocyanate; 1,8-naphthalene diisocyanate; cumene-2,4-diisocyanate; 4-methyloxy-1,3-phenylene diisocyanate; 4-chloro-1,3-phenylenediisocyanate; 4-bromo-1,3-phenylene diisocyanate; 4-ethyloxy-1,3-phenylenediisocyanate; 2,4'-diisocyanatodiphenyl ether; 5,6-dimethyl-1,3-phenylenediisocyanate; 2,4-dimethyl-1,3-phenylenediisocyanate; 4,4'-diisocyanatodiphenyl ether; benzidinediisocyanate; 4,6-dimethyl-1,3-phenylenediisocyanate; 9,10-anthracenediisocyanate; 4,4'-diisocyanatodibenzyl; 3,3'-dimethyl-4,4'-diisocyanatodiphenylmethane; 2,6-dimethyl-4,4'diisocyanatodiphenyl; 2,4-diisocyar.atostilbene; 3,3'-dimethyl-4,4'-diisocyanatodiphenyl; 3,3'-dimethoxy-4,4'-diisocyanatodiphenyl; 1,4-anthracenediisocyanate; 2,5-fluoroenediisocyanate; 1,3-phenylenediisocyanate; 1,4-phenylenediisocyanate; 2,6-diisocyanatobenzylfuran; bis(2-isocyanatoethyl)fumarate; bis(2-isocyanatoethyl)carbonate; bis(2-isocyanatoethyl)-4-cyclohexene-1,2-dicarboxylate; polymethylene polyphenyl isocyanate; 1,4-tetramethylenediisocyanate; 1,6-hexamethylenediisocyanate; 1,10-decamethylenediisocyanate; 1,3-cyclohexylenediisocyanate; 1,4-cyclohexylenediisocyanate; 4,4'-methylene-bis(cyclohexylisocyanate); m- and p-tetramethylxylene diisocyanate; 2,2,4-trimethyl-1,6-hexamethylene diisocyanate; m-and p-xylylene diisocyanate; 3-isocyanatomethyl-3,5,5trimethylcyclohexyl isocyanate; phenylene bis(2-ethyl isocyanate); 4-methyl-1,3-cyclohexylene diisocyanate; 2-methyl-1,3-cyclohexylene diisocyanate; 2,4'-methylene bis(cyclohexylisocyanate); lower alkyl esters of 2,5-diisocyanatovaleric acid; and polyisocyanates containing three or more isocyanate groups per molecule such as triphenylmethane triisocyanate and 2,4-bis(4-isocyanatocyclohexylmethyl)cyclohexyl isocyanate.

4,4'-diphenylmethane diisocyanate (MDI) is preferred for preparing a polyurethane base resin for use in the processes of the invention.

Polyols suitable for use in preparing a polyurethane base resin for use in the processes of the invention include polyesters, polyethers, polyamides, polycarbonates, polyesteramides, polythioethers, polyacetals, polyurethanes, polybutadienes or copolymers with acrylonitrile or styrene for example, castor oil and its derivatives and any monomeric polyols such as ethylene glycol, 1,2-propylene glycol, diethylene glycol, triethylene glycol, dipropylene glycol, trimethylene glycol, 1,3- and 1,4-butane diol; hexamethylene glycol, neopentyl glycol, glycerin, trimethylolpropane and pentaerythritol.

Polyester polyols are preferred to provide a suitable balance in the prepolymer rigidity at room temperature and fluidity at moderately elevated temperatures such as from about 50° C. to about 70° C. Polyester polyols having a functionality of two or more are preferred since such polyols form essentially linear oligomers when reacted with excess diisocyanate. The linearity of the prepolymer imparts thermoplasticity and stability to the base resin and the final adhesive product. Saturated copolyester diols are most preferred because by using combinations of various types of such diols the final adhesive properties can be adjusted to achieve desired properties. Polyester polyols formed from one or more compounds which possess at least two hydroxyl groups such as polytetramethylene ether glycol, also ethylene glycol, diethylene glycol, triethylene glycol, 1,2-propylene glycol, dipropylene glycol, trimethylene glycol, 1,3- and 1,4-butanediol, neopentyl glycol, hexamethylene glycol, decamethylene glycol, glycerin, trimethylolpropane, hexanetriol, pentaerythritol, sorbitol, and one or more compounds which possess at least two carboxyl groups, such as malonic acid, maleic acid, succinic acid, adipic acid, tartaric acid, pimelic acid, sebacic acid, oxalic acid, glutaric acid, suberic acid, azelaic acid, dimerized fatty acids, isophthalic acid, phthalic acid, terephthalic acid, hexahydrophthalic acid, aconitic acid, trimellitic acid and hemimellitic acid can also be used. Ring-opened polymers of cyclic esters such as polycaprolactone can also be used and the so called polymer polyol compositions such as polyether polyols and/or polyester polyols, and also polyols which can be obtained by polymerizing ethylenically unsaturated compounds, such as acrylonitrile, styrene, α-methylstyrene and methylmethacrylate in a polyether or polyester polyol are suitable. Also suitable are 1,2polybutadiene glycol, 1,4-polybutadiene glycol, polyhydroxy polyacrylate, and epoxy resins and mixtures thereof.

Applicants have invented a polyurethane base resin that is most preferred for use in the present processes for producing thermosetting polyurethane structural adhesive compositions. Moreover, the polyurethane base resin may also be used, without modification, as a reactive adhesive composition that is cured by atmospheric moisture. The polyurethane base resin is prepared by reacting a stoichiometric excess of a polyisocyanate with a combination of three different types of hydroxyl-terminated, linear, saturated copolyesters each having a molecular weight between 1000 and 6000 g/mol.

The first type (Type 1) of hydroxyl-terminated, linear, saturated copolyesters used to produce the polyurethane base resin of the invention is solid, amorphous copolyesters having glass transition temperatures above 0° C. and at least from about 80% to about 100% aromatic character. These copolyesters impart increased hardness and decreased elasticity to the polyurethane base resin.

The second type (Type 2) of hydroxyl-terminated, linear, saturated copolyesters used in producing the polyurethane base resin of the invention is liquid copolyesters having glass transition temperatures between about −10° C. and about −60° C. and having from about 40% to about 100% aliphatic character. These copolyesters impart increased open time, adhesion and elasticity and decreased flow point, cohesion and hardness to the polyurethane base resin.

The third type (Type 3) of hydroxyl-terminated, linear, saturated copolyesters used to produce the polyurethane base resin of the invention is solid, partially crystalline copolyesters having glass transition temperatures below 0° C. and having from about 40% to about 100% aliphatic character. These copolyesters impart increased cohesion and decreased melt viscosity and open time to the polyurethane base resin.

The term "linear saturated copolyesters" as used herein means that the copolyesters are prepared by polymerization of one or more dicarboxylic acids or the corresponding anhydrides thereof, including acids having an aromatic structure, such as phthalic acids, with diols such as ethylene glycol, propylene glycol, butylene glycol, hexylene glycol, diethylene glycol or neopentyl glycol. The term "linear saturated copolyesters" does not include unsaturated dicarboxylic acids such as maleic acid or fumaric acid.

The proportions, by relative equivalents (wherein the total equivalents of Types 1, 2, and 3 is 1.0), of the three copolyesters in the polyurethane base resin of the invention are as follows: Type 1: from about 0 to about 1; Type 2: from about 0 to 1; and Type 3: from about 0 to 1. Preferably, the proportions are Type 1: from about 0 to 0.50; Type 2: from about 0 to about 0.50; and Type 3: from about 0.25 to about 0.75. Most preferably, the proportions are Type 1: about 0.25; Type 2: about 0.25; and Type 3: about 0.50.

Synthesis of both conventional polyurethane base resins, as well as the polyurethane base resin of the present invention, are carried out in glass resin reaction equipment under a dry nitrogen blanket or under vacuum. The polyols are preheated to about 60° C. while mixing. The isocyanate is preheated to at least 50° C. in a closed container in an oven. Following combination of the reactants to form a prepolymer, and completion of any exotherm, with or without catalyst addition, the prepolymer is heated to about 80° C. until stabilization occurs. The term "stabilization" as used herein refers to the absence of further changes in appearance, such as color and clarity, viscosity and percent free isocyanate content over a period of from 15 to 30 minutes after the prepolymer reaches 80° C. During the reaction, the percent of free isocyanate gradually decreases until a final targeted range of about ±0.1% NCO is reached, where % NCO=42.02×100/equivalent weight of the prepolymer. The isocyanate content is determined by measuring by titration, such as by ASTM D2572 "Standard Test Method For Isocyanate Groups In Urethane Materials Or Prepolymers".

The ratio of isocyanate group equivalents to hydroxyl group equivalents for the synthesis of the polyurethane base resin is from about 1.05:1.00 equivalents NCO/OH to about 10:1 equivalents NCO/OH, preferably from about 1.2:1.0 equivalents NCO/OH to about 3:1 equivalents NCO/OH, most preferably about 2:1 equivalents NCO/OH.

An organometallic catalyst such as an organotin catalyst may also be present during the synthesis of the polyurethane base resin. The catalyst accelerates the synthesis and may improve the cure rate of the adhesive composition. Tertiary amine catalysts may provide similar effects. However, a particular organometallic or tertiary amine catalyst may be evaluated to determine whether it would impart an adverse effect on package stability of the base resin or of the final adhesive product properties.

Exemplary catalysts suitable for use in cure acceleration and/or synthesizing the polyurethane base resin include trialkylamines such as trimethylamine, triethylamine, dimethyldodecylamine, heterocyclic amines, such as N-alkyl morpholines (e.g., N-methylmorpholine, N-ethylmorpholine, B,B'-dimorpholinodiethylether), N,N-dimethylethanolamine, 1,8diazabicyclo[5.4.0]undecene-7 (DBU) and its salts, 1,4dimethylpiperazine, triethylenediamine, and aliphatic polyamines, such as N,N,N',N'-tetramethyl-1,3-butanediamine, N,N,N',N'',N''-pentamethyldiethylene triamine, N,N-dimethylcyclohexylamine, N-methyldicyclohexylamine, N,N,N',N'-tetramethylpropylene diamine and N,N,N',N'-tetramethylhexamethylene diamine; bis[2-(N,N-dialkylamino)alkyl]ether(s) for example, bis[2-(N,N-dimethylamino)ethyl]ether, bis[2-(N,N-dimethylamino)-1-methylethyl]ether, and 2-(N,N-dimethylamino)ethyl-2-(N,N-dimethylamino)-1-methylethylether.

The organotin compound may be a stannous or stannic compound, such as a stannous salt of a carboxylic acid, a trialkyltin oxide, dialkyltin oxide, a dialkyltin dihalide, or dialkyltin oxide. The organic groups of the organic portion of the compound are usually hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin oxide, stannous octoate, stannous oleate, or a mixture thereof may be used.

Organometallic and metallic salt catalysts used in polyurethane chemistry typically contain metals or metallic ions from Groups VIII I-B, II-B and IV-A of the Periodic Table, e.g., tin, lead, iron, and mercury. Organometallic compounds of bismuth, titanium, antimony, uranium, cadmium, cobalt, thorium, aluminum, zinc, nickel, molybdenum, vanadium, copper, manganese, and zirconium are suitable for use in the invention. Mercury salts such as mercuric acetate are known to have catalytic activity toward the NCO/OH reaction. These salts tend to be less effective in catalytic quantities, however, and molar quantities may be required. Compounds of the formula RHgX, wherein R is aliphatic, aromatic, or cycloaliphatic and X is OCOR' (R' being defined in the same manner, but not necessarily the same radical as R) are highly effective in catalytic quantities. In addition to the aforementioned "catalyst" other chemicals that function as catalysts for providing special properties are suitable for use in the invention.

The catalyst is added in an amount of from about 0% to about 3% by weight of the resin, preferably from about 0.001% to about 1.500%, most preferably about 0.01%.

After completion of the synthesis reaction, the polyurethane base resin is degassed by vacuum, preferably greater than 29 in. Hg. The base resin can then be packaged in air tight containers blanketed with nitrogen for use in the processes of the invention or can be processed with modifying additives such as stabilizers, fillers, pigments, thixotropes, plasticizers, adhesion promoters, catalysts, reinforcements, antioxidants, flame retardants, crosslinking agents or solvents.

The amine-terminated solid polyamide resin used in the processes of the present invention functions as an in-situ heat activated curative for the polyurethane base resin.

The polyamide resin can be formed into a powder and dispersed into a polyurethane base resin. The polyamide resin is prepared by reacting an excess of a polyamine compound with a polycarboxylic acid. Preferably, a diamine compound is employed. The diamine compound may be one or more of an aliphatic, cycloaliphatic or aromatic diamine compound having from about 2 to about 40 carbon atoms. Alkylene diamine compounds are most preferred. Exemplary suitable diamine compounds include ethylene diamine, 1,2-diaminopropane, 1,3-diaminopropane, 1,4-diaminobutane, p-xylene diamine, 1,6-hexamethylene diamine, 2-methylpentamethylene diamine, 4,4'-methylenebis(cyclohexylamine), 2,2-di-(4-cyclohexylamine)propane, polyglycol diamines, isophorone diamine, m-xylene diamine, cyclohexanebis(methylamine), bis-1,4-(2'-aminoethyl)benzene, 9-aminomethylstearylamine, 10-aminoethylstearylamine; 1,3-di-4-piperidyl propane, 1,10-diaminodecane, 1,12-diaminododecane, 1,18-diaminooctadecane, piperazine, N-aminoethylpiperazine, bis-(3-aminopropyl)piperazine, polyethylene polyamines such as diethylene triamine and triethylene tetramine, diethyltoluene diamine, methylene dianiline and bis(aminoethyl)diphenyl oxide. Dimeric fat diamines and "ether diamines" may also be used. These diamines are described in U.S. Pat. No. 4,018,733, and U.S. Pat. No. 3,010,782, the disclosures of which are incorporated herein by reference.

Monoamines are also suitable for use in the invention. Exemplary suitable amines include methylamine, dimethylamine, ethylamine, diethylamine, n-propylamine, di-n-propylamine, isopropylamine, n-butylamine, isobutylamine, sec-butylamine, tert-butylamine, di-n-butylamine, monoamylamine, diamylamine, ethylbutylamine, n-hexylamine, di-n-hexylamine, cyclohexylamine, benzylamine, α-phenylethylamine, β-phenylethylamine, aniline, methylaniline, diphenylamine, o-toluidine, m-toluidine, p-toluidine, o-anisidine, m-anisidine, p-anisidine, dodecylamine, cocoamine, hexadecylamine, octadecylamine, oleylamine, dicocoamine, and di(hydrogenated-tallow)amine; amides such as cocoamide, octadecanamide, oleamide, o-toluene sulfonamide and p-toluene sulfonamide; and polyetheramines such as polyoxyethylene amine(s) and polyoxypropylene amines(s).

Polycarboxylic acids having a functionality of two are preferred for making an amine-terminated solid polyamide resin for use in the process of the invention. Dimerized fatty acids are suitable, however, straight chain lower molecular weight diacids such as sebacic acid, azelaic acid and dodecanedioic acid are preferred in preparing the polyamide resin. The term "dimerized fatty acid" is intended to include any acid obtained by dimerizing saturated, ethylenically unsaturated or acetylenically unsaturated naturally occurring or synthetic monobasic aliphatic carboxylic acids containing from 8 to 24 carbon atoms. Such dimerized fatty acids consist essentially of a mixture of about 36 carbon atom dicarboxylic acids and usually also contain several isomeric dimers together with a small amount of trimer and higher polymers, and are fully described in U.S. Pat. No. 4,018,733, the disclosure of which is incorporated herein by reference. Other suitable dicarboxylic acids include those that contain from 2 to 20 carbon atoms, such as oxalic, glutaric, malonic, adipic, succinic, suberic, sebacic, azelaic, dodecanedioic, pimelic, terephthalic, isophthalic, phthalic, napthalene dicarboxylic acids and 1,4- or 1,3-cyclohexane dicarboxylic acids.

In general, any dicarboxylic acid in which the carboxylic acid groups are separated by a bivalent hydrocarbon group which may be saturated or unsaturated, aliphatic, aromatic or cycloaliphatic or which may have two or more aliphatic, aromatic or cycloaliphatic moieties, can be used to form the polyamides. Also, any polycarboxylic acid in which the average functionality (number of functional groups per molecule) is greater than two may be used. Corresponding acid anhydrides, esters, and acid chlorides of the foregoing acids are also suitable for use in the present invention and are encompassed by the term "dicarboxylic acid."

Monocarboxylic acids are also suitable for use in the invention. Exemplary suitable monocarboxylic acids include fatty acids. The term "fatty acids" as used herein is intended to include saturated, ethylenically unsaturated and acetylenically unsaturated naturally occurring and synthetic monobasic aliphatic acids containing from 8 to 24 carbon atoms. Suitable saturated fatty acids include branched and straight chain acids such as caprylic acid, pelargonic acid, capric acid, lauric acid, myristic acid, palmitic acid, isopalmitic acid, stearic acid, isostearic acid, arachidic acid, behenic acid and lignoceric acid. Suitable ethylenically unsaturated acids include the branched or straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodimic acid, eicosatetraenoic acid, nisinic acid, scoliodonic acid and chaulmoogric acid. Any acetylenically unsaturated fatty acid, both straight and branched chain, both mono-unsaturated and poly-unsaturated, are useful herein. Suitable examples of such materials include 10-undecynoic acid, tariric acid, stearolic acid, behenolic acid and isamic acid. Also, monocarboxylic acids having from two to seven carbon atoms may be used, such as acetic acid, propionic acid, butyric acid, valeric acid and caproic acid.

Any conventional process for preparing a polyamide resin may be employed. Synthesis is usually performed in glass resin reaction equipment under a dry nitrogen blanket or under vacuum to prevent oxidative degradation. The reactants are blended and heated gradually to from about 180° C. to about 240° C. During temperature elevation, a condenser and collection vessel may be attached to collect the condensed water and any volatilized amine.

A phosphoric acid catalyst may also be employed to accelerate and improve the efficiency of the reaction. Exemplary suitable catalysts include acid compounds such as phosphoric acid, oxides or carbonates of alkaline nature such as magnesium oxide or calcium oxide and halogen salts of polyvalent metals and acids. The catalyst is present in an amount of from about 0% to about 3% by weight of the resin, preferably in an amount of from about 0.005% to about 0.500% by weight, most preferably in an amount of about 0.01% by weight.

The ratio of equivalents of amine to acid groups i.e., $NH_x/COOH$ groups (where x is 1 or 2) for the aminopolyamide synthesis is from about 1.05:1.00 equivalents $NH_x/COOH$ to about 10.00:1.00 equivalents $NH_x/COOH$, preferably from about 1.2:1.0 equivalents $NH_x/COOH$ to about 5.0:1.0 equivalents $NH_x/COOH$, most preferably about 1.35:1.00 equivalents $NH_x/COOH$.

When the appearance, viscosity, acid value and amine value have stabilized, a vacuum, preferably greater than 29 in. Hg, is applied to degas the polymer and remove trace amounts of water. The cooled solid product is then milled to a fine powder.

The powdered amine-terminated solid polyamide resin can then be dispersed in the polyurethane base resin at a temperature of from about 25° C. to about 200° C., preferably at from about 70° C. to about 100° C. to form a stable dispersion of a nonactivated adhesive composite. The adhesive composite is then activated by heating to a temperature of from about 50° C. to about 250° C., preferably from about 120° C. to about 220° C., the temperature being above the softening point of the amine terminated solid polyamide resin. By such heating, the amine groups become much more reactive with the isocyanate-functional polyurethane base resin whereby the adhesive composite cures to form a thermoset polyurethane structural adhesive composition.

An additional embodiment of the present invention relates to a process for making the surface of the aminopolyamide resin less reactive, and improving the stability of the adhesive comprising treating the polyamide resin by drying, or by treating with a mono-isocyanate compound, or by encapsulating the amino polyamide resin in an inert material prior to dispersing the same in the polyurethane base resin. Applicants have found that such treatments result in greatly improved stability of the adhesive composition both at room temperature and at elevated temperatures.

Exemplary suitable mono-isocyanate compounds useful for surface-treatment in the invention include p-toluene sulfonyl isocyanate; methyl isocyanate; ethyl isocyanate; isopropyl isocyanate; n-butyl isocyanate; t-butyl isocyanate; cyclohexyl isocyanate; n-octadecyl isocyanate; isocyanatoethylmethacrylate; and isocyanatopropyltriethoxysilane.

The mono-isocyanate compounds are used in amounts of from about 0 to about 10 weight percent, preferably from 0.5 to about 5 weight percent, most preferably about 2 weight percent of the polyamide resin.

As set forth above, applicants have found that encapsulation of the amine-terminated polyamide resin in an inert material provides improved stability, i.e., shelf life, molten potlife and improved green strength and reduced open time of the nonactivated thermoplastic polyurethane structural adhesive composite. Encapsulation isolates the polyamide resin from the isocyanate terminals of the polyurethane base resin and thus prevents or minimizes formation of the final adhesive product. Thermoplastic resins are particularly suitable for use as encapsulants if they exhibit sharp softening points, low viscosity when molten, ease in milling, insolubility in the polyurethane base resin and inertness toward isocyanates. The encapsulant material has a melting point higher than the melting point of the polyurethane base resin but lower than the melting point of the amine-terminated solid polyamide resin and the point of water formation or release from the water generating curing composition.

The proportion of the amine-terminated solid polyamide resin to the encapsulant material is from about 0 to about 100 weight percent polyamide resin, based on the total weight of the encapsulated resin, preferably from about 25 to about 75 weight percent polyamide resin, most preferably, about 50 weight percent polyamide resin.

Exemplary thermoplastic resins suitable for use in the process of the invention include hydrocarbon plastics and elastomers such as polyethylenes, polypropylenes, polymers of α-oolefins such as 1-butene or 4-methylpentene-1, ionomers, chlorosulfonated polyethylenes, ethylene-propylene-diene terpolymers, natural rubber and other polyisoprenes, styrene-butadiene copolymers, acrylonitrile-butadiene copolymers, polybutadienes, polyisobutylenes, polychloroprenes, block copolymers of styrene-butadiene-styrene, styrene-isoprene-styrene and styrene-ethylene-butylene-styrene; carbon-chain polymers such as polystyrene, acrylonitrile-butadiene-styrene copolymers, polyacrylates, polymethacrylates, ethylene-acrylic acid copolymers, polyacrylonitriles, polyvinyl acetates, ethylene-vinylacetate copolymers, polyvinyl acetals, polyvinylbutyrals, polyvinyl chlorides, polyvinylidene chlorides, polytetrafluoroethylenes, polyhexafluoropropylenes, polychlorotrifluoroethylenes, polyvinylfluorides and polyvinylidene fluorides; heterochain thermoplastics such as polyamides, polyethyleneterephthalates, polyoxymethylenes, polycarbonates, polysulfides, polyphenylenesulfides, polysulfones, polyethersulfones, cellulosics, epoxies, polyesters, phenolics and polyurethanes; and high temperature polymers (including inorganic polymers) such as polyimides, polyphenyleneoxides, polyacetylenes and polydichlorophosphazenes. Based on requirements for an encapsulant, a particular thermoplastic resin may prove to be effective if its melting point (or melting point range) is less than the curing agents' activation temperature (or range), and is greater than that of the polyurethane base resin. Copolymers and combinations of all of the above thermoplastic resins are also suitable for use in the process of the invention.

A preferred type of inert thermoplastic resin for use as an encapsulant has been found to be polyamide resins, most preferably, alkyl-terminated polyamide resins.

Alkyl-termination of the polyamide is preferred to provide inertness toward the isocyanate-functional base resin and the amino polyamide resin to be encapsulated. To provide the desired alkyl-termination, a monofunctional amine or monfunctional acid is employed as a capping agent in the synthesis of the encapsulant. Exemplary suitable monofunctional amines and monofunctional acids include those listed above as monoamines or monocarboxylic acids suitable for use in the synthesis of amine-terminated polyamide resins.

Additionally, polyamines and/or polycarboxylic acids may be employed. Exemplary suitable polyamines and polycarboxylic acids are those listed above as polyamines or polycarboxylic acids suitable for use in the synthesis of amine-terminated polyamide resins. The ratio of equivalents of amine to acid groups, for the inert polyamide encapsulant synthesis is from about 0.8:1.0 to about 1.2:1.0 equivalents $NH_x/COOH$, where x is 1 or 2, preferably from about 0.95:1.00 to about 1.05:1.00 equivalents $NH_x/COOH$, most preferably about 1.0:1.0 equivalents $NH_x/COOH$.

The inert polyamide encapsulant may be synthesized using any conventional process for polyamide synthesis, such as set forth above for the synthesis of the amine-terminated polyamide resin. After completion, the molten resin is cooled to a temperature below the activation temperature (or range) of the curative(s) to be employed. The amino polyamide resin is then dispersed into the molten encapsulant to form a non-activated encapsulant composite. A vacuum, preferably at least 29 in. Hg., is applied to degas the encapsulant composite and remove any moisture. The composite is cooled and milled into a powder which is then dispersed in the polyurethane base resin at a temperature of from about 25° C. to about 200° C., preferably at from about 70° C. to about 100° C. to form a stable non-activated adhesive composite.

The stabilized adhesive composite is activated by heating to a temperature above the melting point of the amine-terminated polyamide. At such temperatures, the amine groups become much more reactive with the isocyanate functional polyurethane base resin. The amine-terminated polyamide resin acts as an in-situ curing agent to cure the composite and form a thermosetting polyurethane structural adhesive composition.

Another embodiment of the invention relates to a process for producing a thermosetting polyurethane structural adhesive composition comprising dispersing an amine-terminated solid polyamide resin and a water generating curing composition into a polyurethane base resin at a temperature of from about 25° C. to about 200° C. to form a nonactivated adhesive composite, and heating the same at a temperature of from about 50° C. to about 250° C. to cure the composite to form a thermoset adhesive composition.

Organic or inorganic compounds that release or form water at elevated temperature are suitable for use in this process of the invention. Preferably, the following compositions are employed: $CaSO_4.2H_2O$, $CaSO_4.1/2H_2O$, $NaHCO_3$, $(NH_4)_2CO_3$, $(NH_4)_2C_2O_4$ or ammonium stearate. If desired, the water generating curing compositions may be treated for improved stability by drying, or with mono-isocyanates, or by encapsulating the same in an inert material. The adhesive composition that results after curing is a foamed adhesive product and thus has additional properties such as lighter weight, insulation from sound and temperature, and is less expensive per unit volume. The foaming is a result of carbon dioxide formation during the curing reaction. The degree of foaming may be enhanced by the addition of one or more silicone surfactants.

The equivalents of isocyanate groups (from the polyurethane base resin) to active hydrogen groups (from the curing composition), i.e., NCO/yH groups (where y=N, NH, O, S, HO, or COO), in the adhesive composition is from about 0.5:1.0 to about 2.0:1.0 equivalents NCO/yH, most preferably from about 0.8:1.0 to about 1.2:1.0 equivalents NCO/yH, most preferably about 1.1:1.0 equivalents NCO/yH.

Further, additives may be employed to impart additional desired properties to the adhesive compositions produced by the processes of the invention. Exemplary suitable additives include fillers, reinforcements, thixotropes, pigments, plasticizers, catalysts, antioxidants, stabilizers, adhesion promoters, flame retardants, cross-linking agents and solvents.

The invention will be further clarified by the following examples, which are intended to be purely exemplary of the invention.

All reaction or blending processes described in the following examples involve the use of a constant nitrogen purge unless otherwise noted.

EXAMPLE 1

Preparation of Polyester-Urethane Base Resin

Into a one liter resin reaction flask, 298.9 g of Dynacoll RP-360 (Hüls America), 144.6 g of Dynacoll RP-230 and 74.8 g of Dynacoll RP-110 were charged under a nitrogen blanket. The three copolyester diols were heated to 91° C. and mixed until homogenous and then allowed to cool to 73° C. 81.7 g of MDI (4,4'-diphenylmethane diisocyanate) were charged while mixing. As the reaction proceeded, an exotherm to 81° C was observed. The resulting prepolymer was then degassed by applying a vacuum of 29.8 in. of Hg. The product was then analyzed for isocyanate content. 2.05% NCO was obtained. The product was then discharged into half-pint containers and sealed under nitrogen.

A 30 g sample of the molten resin was poured into an aluminum weighing dish and allowed to cool and solidify and then demolded. Following exposure to atmospheric moisture, periodic hardness measurements were taken.

| Days of R.T. Exposure | Shore D Hardness |
|---|---|
| 1 | 33 |
| 3 | 42 |
| 7 | 51 |
| 14 | 51 |

A sealed container of the prepolymer was stored at 70° C. for 19 days. With the exception of a moderate surface skin, the material remained stable (i.e. clear and fluid).

The Brookfield Thermosel viscosity was measured at 70° C. and was found to be 59,700 cP.

The open time was measured and was found to be 2 minutes. Open time is the time period during which wet delamination occurs when pulling off a 1"×4" strip of Kraft paper at a 90° angle from a cooling 20 mil wet molten film of adhesive on cardboard. The film is prepared by heating an adhesive and drawdown bar to 120° C. and then testing at 15 second intervals. The open time is the 15 second interval immediately before dry delamination or fiber tear occurs.

The base resin obtained demonstrated good adhesion to plastics and metals (without further modification) when treated as an ambient moisture-cured polyurethane. Shear strengths were found to be as high as 1550 lbs./in.$^2$.

EXAMPLE 2

Preparation of Amino-polyamide Curative

Using the same reaction apparatus as in Example 1, 504.6 g of Dytek A (2-methylpentamethylenediamine from DuPont) were charged. While mixing, 295.4 g of Sebacic Acid, CP Grade (Union Camp), were added. These reactants were mixed and gradually heated to 245° C. The reaction temperature was maintained above 230° C. for approximately 10 hours, the final hour of which a vacuum of 30 in. Hg was applied to degas the polyamide resin and remove trace amounts of water. The molten resin was discharged into a release paper lined box and cooled under nitrogen in a desiccator.

Once completely cooled and solidified, the resin was broken into medium sized chips and milled to a powder (with the aid of liquid nitrogen chilling) using a Brinkmann Centrifugal Mill. The milled polyamide was then passed through a 250μ screen to remove the coarse particles. The fine powdered resin was then packaged under nitrogen for future use or further modification.

Test Results:

| | | |
|---|---|---|
| Amine Value (mg KOH/g) | = | 109.9 |
| Acid Value (mg KOH/g) | = | 0.3 |
| Shore D Hardness | = | 57 |
| Ring and Ball Softening Point (°C.) | = | 136 |
| Brookfield Thermosel Viscosity (cP) | = | 90 at 200° C. |
| | | 268 at 160° C. |
| | | 1,735 at 120° C. |

EXAMPLE 3

Treatment for Stabilization of Milled Amino-polyamide Curative

A 180.0 g portion of a solution of 1% (by weight) p-toluenesulfonyl isocyanate in dry toluene was charged to the same reaction apparatus as in Example 2. While mixing, 180.0 g of powdered (≦250μ) amino-polyamide from Example 2 was charged to the reactor. The contents were blended thoroughly until a homogeneous suspension resulted. Mild heating was applied until the suspension reached ≧45° C. The mixture was agitated with continued mild heating until the majority of toluene was driven off. A vacuum of >29 in. Hg was applied to the relatively dry powdery mass to remove any remaining solvent. The treated amino-polyamide powder was then discharged into a sealable container under nitrogen and stored for future incorporation with a polyurethane base resin.

Test Results:

| | | |
|---|---|---|
| Amine Value (mg KOH/g) | = | 105.5 |
| Ring and Ball Softening Point (°C.) | = | 121 |
| Brookfield Thermosel Viscosity (cP) | = | 70 at 200° C. |
| | | 200 at 160° C. |

EXAMPLE 4

Preparation of Polyester-urethane/Amino-polyamide Composite Adhesive System

A polyester-urethane base resin similar to that in Example 1 was synthesized by reacting a blend of 200.0 g of RP-360, 96.8 g of RP-230 and 50.0 g of RP-110 in the presence of 4.1 g of 4A Molecular Sieves (Union Carbide) with 54.7 g MDI to a NCO of 2.16. With this molten degassed prepolymer at a temperature of 84° C., 103.5 g of the treated amino-polyamide curative of Example 3 were charged gradually while mixing. When the addition was completed, a temperature of 74° C. was observed. The homogeneous dispersion was degassed under a vacuum of >29 in. Hg and discharged into half-pint containers under nitrogen.

Test Results:

| | | |
|---|---|---|
| Brookfield Thermosel Viscosity (cP) | = | 132,000 at 80° C. |
| | | 106,500 at 115° C. |
| | | 42,500 at 160° C. |
| | | 36,500 at 170° C. |
| | | 45,000 at 180° C. |
| | | >500,000 at 188° C. |

Curing was observed at 180° C. based on a viscosity increase as the temperature was being elevated.

| Shear Adhesion to Cold Rolled Steel | | | |
| --- | --- | --- | --- |
| | Example 1 Type* | Example 4 Type | % Increase In Shear Adhesion |
| 30 sec. at 180° C. + 2 hrs. at R.T. | 231 lbs./in.² | 457 lbs./in.² | 98% |
| 30 sec. at 220° C. + 2 hrs. at R.T. | 149 lbs./in.² | 649 lbs./in.² | 336% |

*This sample was synthesized in Example 1.

EXAMPLE 5

Preparation of Comparative Polyester-urethane/Amino-polyamide Composite Adhesive System An adhesive product was prepared in the same manner as in Example 4 with the exception that the milled amino-polyamide was not treated for stabilization with p-TSI.

| Test Results: Sealed Container Stability at 70° C. | | |
| --- | --- | --- |
| | Example 5 | Example 4 |
| 3 hrs. | Extremely viscous, semi-gelled paste | Viscous, fluid |
| 3 days | — | Viscous, fluid |
| 6 days | — | Soft, elastic gel |

Note:
Observations made at 70° C.

Treatment for stabilization of the amino-polyamide resulted in a tremendous improvement in molten potlife from about 3 hrs. to 3–6 days.

EXAMPLE 6

Preparation of Inert Thermoplastic Encapsulant

Using the same reaction equipment as the previous examples, 368.7 g of Empol 1010 (dimerized fatty acids from Quantum Chemicals, Emery Division) and 8.0 g of a 1% (by weight) solution of $H_3PO_4$ (85%, aq) in Empol 1010 were charged and mixed until homogeneous. 15.0 g of Sebacic Acid, CP Grade and 408.2 g of Armeen 18D (octadecylamine from Akzo Chemie America, Armak Chemicals Division), were charged, mixed and heated gradually to 241° C. The temperature was maintained above 230° C. for approximately two hours, the final hour of which a vacuum of 29.6 in. Hg was applied to degas the polyamide resin and remove trace amounts of water. The molten resin was discharged into a release paper lined box and cooled under nitrogen in a desiccator and stored for future use as an encapsulant for curing agents.

| Test Results: | | |
| --- | --- | --- |
| Acid Value (mg KOH/g) | = | 1.1 |
| Amine Value (mg KOH/g) | = | 1.7 |
| Shore D Hardness | = | 41 |
| Ring and Ball Softening Point (°C.) | = | 100° C. |
| Brookfield Thermosel Viscosity (cP) | = | 525 at 100° C. |

EXAMPLE 7

Preparation of Polyester-urethane with Inert Thermoplastic Encapsulant Present

In the same manner as in Examples 4 and 5, a polyesterurethane based adhesive was prepared except that instead of incorporating a curing agent, a portion of milled ($\leq 250\mu$) inert thermoplastic encapsulant from Example 6 was incorporated into the urethane base resin. The following quantities were employed: 266.4 g of RP-360, 128.9 g of RP-230, 66.6 g of RP-110, 72.8 g of MDI and 65.3 g of powdered encapsulant resin from Example 6.

| Test Results: | Example 1 | Example 7 |
| --- | --- | --- |
| Shear Adhesion to Cold Rolled Steel | | |
| 30 sec. at 180° C. + 2 hrs. at R.T. | 231 lbs./in.² | 245 lbs./in.² |
| 30 sec. at 220° C. + 2 hrs. at R.T. | 149 lbs./in.² | 246 lbs./in.² |
| Open Time | | |
| 120° C., 20 mil | 2 min. | 1.5 min. |

The presence of the encapsulant alone provided up to a 65% increase in initial shear strength and a 25% reduction in open time.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A one component heat-activated thermosetting polyurethane composition comprising an isocyanate-terminated polyurethane base resin and an amine-terminated polyamide resin in the form of a powder dispersed in the base resin wherein said composition cures by the reaction of the base resin and the polyamide resin.

2. The thermosetting polyurethane composition of claim 1 wherein the polyurethane base resin is prepared by reacting excess 4,4'-diphenylmethane diisocyanate and at least one saturated copolyester diol compound.

3. The thermosetting polyurethane composition of claim 1 wherein the amine-terminated polyamide resins is the reaction product of an excess amount of a polyamine compound and a polycarboxylic acid compound having a functionality of at least two.

4. The thermosetting polyurethane composition of claim 3 wherein the ratio of amine group equivalents to acid group equivalents is from about 1.05:1.00 to about 10.00:1.00 equivalents $NH_x$/COOH wherein x is 1 or 2.

5. The thermosetting polyurethane composition of claim 3 wherein the polyamine compound is selected from 2-methylpentamethylene diamine, hexamethylene diamine, diethylene triamine, piperazine and mixtures thereof and wherein the polycarboxylic acid is selected from sebacic acid, azelaic acid, dodecanedioic acid, dimer acid, trimer acid and mixtures thereof.

6. The thermosetting polyurethane composition of claim 5 wherein the amine-terminated polyamide resin is treated with a mono-isocyanate compound.

7. The thermosetting polyurethane composition of claim 3 wherein the polycarboxylic acid is a dicarboxylic acid and wherein the polyamine compound is a diamine compound or triamine compound.

8. The thermosetting polyurethane composition of claim 1 wherein the polyurethane base resin is a liquid.

9. The thermosetting polyurethane composition of claim 1 wherein the amine-terminated polyamide resin is encapsulated with an inert encapsulant composition.

10. The thermosetting polyurethane composition of claim 1 wherein the ratio of equivalents of isocyanate groups to active hydrogen groups in said composition is from about 0.5:1.0 to about 2.0:1.0.

11. The thermosetting polyurethane composition of claim 1 wherein the polyurethane base resin has a melting point at least 5° C. lower than the melting point of the amine-terminated polyamide resin.

12. The thermosetting polyurethane composition of claim 1 wherein the composition is a structural adhesive.

* * * * *